United States Patent
Schulze et al.

(10) Patent No.: US 12,441,223 B2
(45) Date of Patent: Oct. 14, 2025

(54) COATED MOTOR VEHICLE INTERIOR TRIM PART

(71) Applicant: ADLER PELZER HOLDING GMBH, Hagen (DE)

(72) Inventors: Volkmar Schulze, Schierling (DE); Ray Singh, Schwelm (DE)

(73) Assignee: ADLER PELZER HOLDING GMBH, Hagen (DE)

( * ) Notice: Subject to any disclaimer, the term of this patent is extended or adjusted under 35 U.S.C. 154(b) by 335 days.

(21) Appl. No.: 17/603,160

(22) PCT Filed: Mar. 16, 2020

(86) PCT No.: PCT/EP2020/057094
§ 371 (c)(1),
(2) Date: Oct. 12, 2021

(87) PCT Pub. No.: WO2020/207710
PCT Pub. Date: Oct. 15, 2020

(65) Prior Publication Data
US 2022/0194285 A1 Jun. 23, 2022

(30) Foreign Application Priority Data
Apr. 10, 2019 (DE) ............. 10 2019 109 462.3

(51) Int. Cl.
*B60N 3/04* (2006.01)
*B32B 7/12* (2006.01)
(Continued)

(52) U.S. Cl.
CPC ............. *B60N 3/048* (2013.01); *B32B 7/12* (2013.01); *B32B 19/02* (2013.01); *B32B 19/06* (2013.01);
(Continued)

(58) Field of Classification Search
None
See application file for complete search history.

(56) References Cited

U.S. PATENT DOCUMENTS 4,460,745 A * 7/1984 Adur .................. C09J 123/04
525/193
5,249,621 A * 10/1993 Aghajanian .......... C04B 41/88
164/101
(Continued)

FOREIGN PATENT DOCUMENTS

CN 103897447 * 7/2014
DE 100 47 977 A1 4/2002
(Continued)

OTHER PUBLICATIONS

Machine Translation of CN103897447 (Year: 2014).*
(Continued)

*Primary Examiner* — Shawn Mckinnon
(74) *Attorney, Agent, or Firm* — Schmeiser, Olsen & Watts, LLC

(57) ABSTRACT

Provided is a motor vehicle interior trim part, in particular a floor trim, luggage compartment trim or a loading floor, the useful area (visible area/surface) of which has high utility properties, wherein a carrier material of a useful area on the use side is coated completely or partially with coating particles, and to the use of coating particles, including an adhesive and a filler, for coating an upper material of motor vehicle interior trim parts.

8 Claims, 1 Drawing Sheet

(51) Int. Cl.
  *B32B 19/02* (2006.01)
  *B32B 19/06* (2006.01)
  *B32B 27/12* (2006.01)
  *D06M 15/693* (2006.01)

(52) U.S. Cl.
  CPC ........... *B32B 27/12* (2013.01); *D06M 15/693* (2013.01); *B32B 2255/02* (2013.01); *B32B 2255/26* (2013.01); *B32B 2260/025* (2013.01); *B32B 2307/718* (2013.01); *B32B 2605/003* (2013.01)

(56) References Cited

U.S. PATENT DOCUMENTS

| | | | | |
|---|---|---|---|---|
| 2003/0184107 | A1* | 10/2003 | Hapspel | B60R 5/045 |
| | | | | 296/24.4 |
| 2008/0220200 | A1 | 9/2008 | Juriga | |
| 2010/0152310 | A1* | 6/2010 | Shahidi | C08J 7/16 |
| | | | | 427/222 |
| 2011/0186381 | A1 | 8/2011 | Ogawa et al. | |
| 2013/0209735 | A1* | 8/2013 | Kim | B32B 3/16 |
| | | | | 428/196 |
| 2015/0140260 | A1 | 5/2015 | Taylor et al. | |
| 2018/0142387 | A1 | 5/2018 | Wang et al. | |

FOREIGN PATENT DOCUMENTS

| | | |
|---|---|---|
| DE | 101 34 934 A1 | 2/2003 |
| DE | 102 25 072 C1 | 11/2003 |
| DE | 102008046915 A1 | 3/2010 |
| DE | 10 2014 110 611 A1 | 1/2016 |
| DE | 202016006953 U1 | 1/2017 |
| DE | 10 2017 103 943 A1 | 8/2018 |
| EP | 1190647 A2 | 3/2002 |
| EP | 1 598 476 B1 | 7/2012 |
| EP | 2980310 A1 | 2/2016 |
| JP | 2008534812 A | 8/2008 |
| WO | 2007041622 A2 | 4/2007 |
| WO | 2013125653 A1 | 8/2013 |
| WO | 2015/074870 A1 | 5/2015 |
| WO | 2018/170115 A1 | 9/2018 |
| WO | 2018/219844 A1 | 12/2018 |

OTHER PUBLICATIONS

Machine translation of DE102008046915 (Year: 2010).*
Machine translation of DE10047977 (Year: 2002).*
PCT International Search Report for PCT/EP2020/057094, issued Apr. 23, 2020.

* cited by examiner

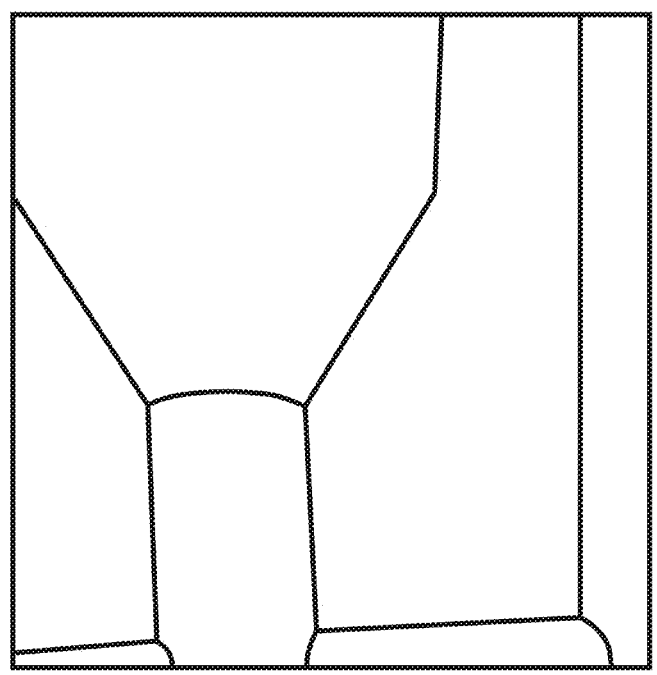

COATED MOTOR VEHICLE INTERIOR TRIM PART

CROSS-REFERENCE TO RELATED APPLICATIONS

This application claims priority to PCT Application No. PCT/EP2020/057094, having a filing date of Mar. 16, 2020, based on German Application No. 10 2019 109 462.3, having a filing date of Apr. 10, 2019, the entire contents both of which are hereby incorporated by reference.

FIELD OF TECHNOLOGY

The following relates to a motor vehicle interior trim part comprising a floor trim, a luggage compartment trim or a loading floor, the useful area or wear layer (visible area/surface) of which has high utility value properties, is coated completely or partially with coating particles using a carrier material comprising a textile sheet structure, and the use of the coating particles for the production of motor vehicle interior trim parts.

BACKGROUND

In the conventional art, various designs of useful areas of motor vehicle interior trim parts are known. By a motor vehicle interior trim part is meant here in particular a motor vehicle floor trim, a luggage compartment trim or a loading floor. Carpet uppers are widely used as useful areas, in particular tufted carpets, velour carpets and flat needle punched carpets.

A floor trim for use in automobiles with useful areas of velour carpets is disclosed, for example, in US 2015/0140260 A1. WO 2015/074870 A1 describes the use of a two-layer carpet with a velour useful area in a motor vehicle.

US 2008/220200 A1 describes a tufted carpet made of PET fibers for the use in the automotive sector. DE 102 25 072 C1 discloses a floor trim for motor vehicles with a tufted velour carpet layer, comprising a tuft carrier carrying pile studs, on the underside of which tuft longitudinal rows with back stitches are present in a zigzag course.

According to DE 101 34 934 A1, flat needle punched webs are described which consist of natural and/or chemical fibers and weigh 200-1600 g/m². At least one of the main areas has a coating in the form of a pattern. The base material may comprise plant fibers such as cotton, kapok, hemp, jute, sisal and coir. The pattern is distributed over all or part of the main area and consists of burls, lines and circles.

US 2018/0142387 A1 describes a method for the formation of a nonwoven composite, which comprises the formation of a first nonwoven layer comprising a plurality of primary fibers and, optionally, bonding fibers. A second nonwoven layer is formed from a plurality of filler fibers and binder fibers. A thermoplastic elastomeric film is sandwiched between the two nonwoven layers, the film comprising a thermoplastic elastomer having an elongation at break greater than 300% and a maximum softening point (thermomechanical analysis end point) between 150° C. and 200° C. (tested according to ASTM E2347-04). The layers are needled together, creating multiple holes in the thermoplastic elastomer layer and moving a portion of the primary fibers from the first nonwoven layer to the second nonwoven layer. The needled stacked layers are heated to change the average size of the holes in the thermoplastic elastomeric film forming the nonwoven composite.

In US2011/0186381 A1, the invention is to provide a sound absorption material having a light weight and an excellent sound absorption property, and to provide a sound absorption material consisting of a fibrous layer of fibers containing at least 50 mass percent of a porous fiber having many minute pores, the minute pores opening onto the surface of the porous fiber and having an air flow resistance in the range of 0.05 to 3.0 kPa s/m. The porous fiber having many minute pores, each of which opens onto the surface of the porous fiber, has an air permeability and thus a sound absorbing property per se. Further sound absorbing properties generated by the interstices between the porous fibers result in the film becoming a sound absorbing material with an extremely high sound absorption efficiency.

According to EP1190647 A2, a protective layer comprises a flexible support substrate for a flat surface and a plurality of flat surface elements distributed over the surface of the substrate and having a greater cutting resistance than the substrate. The flat surface elements are staggered with respect to each other so that additional elements are located in a projection of boundary lines extending between two adjacent elements to break up the projection of the boundary lines across the surface of the substrate. All planar surface elements may have the same shape and may be arranged adjacent to each other without overlapping.

For tufted carpets, in the conventional art, in particular PA6.6, PA6, PP, rPA and PET, rPET as well as the bio-based polyamides (PA 5.10; PA 6.10) or wool are used as yarn/fiber material. In the field of velour and flat needle punched carpets, PET, PET/PP, PP, PA/PET and rPET are predominantly used as yarn/fiber material. The tufting carrier material for the tufting qualities is mostly made of PET/PP, PET/coPET or PET/PA.

The fiber bindings used here mainly comprise EVA and PE for tufted carpets and SBR latex or acrylate for velour and flat needle punched carpets. Furthermore, films, nonwovens, adhesives (hot melts), thermoplastics (mainly PE) and the thermo-bonding process described in EP 1 598 476 B1 are used for velour and flat needle punched carpets. Furthermore, bonding fibers, EVA or thermoplastic dispersions are increasingly used.

Underneath the useful area there are adhesive layers, acoustic/stiffening fleeces, sealing and heavy foils as well as contact/foil fleeces. The coating, mostly as an adhesive layer for sub-fleeces, but also for stiffening, mainly comprises PE or PP.

The sublayers, such as acoustic and/or stiffening nonwovens, usually consist of PET and mixed fiber nonwovens, often with a BiCo fiber content. PE/PA and PE/PA/PE films as well as PE/PA/PE+PET film nonwovens are used as sealing or insulating films. Depending on the acoustic requirements, so-called heavy foils are also used as partial or full-surface insulating foils.

Between the top layer (wear layer plus sublayers) and the car body floor there is usually an insulation layer, which can be made, in particular of PUR foam or non-woven structures (non-wovens or fiber flock (FIMP) composites). If a foam is used, it is firmly bonded (foamed) to the upper material. Non-woven/fiber flock structures can also be firmly bonded to the upper material, in this case they are usually glued. However, it is also possible to use a purely superimposed structure without a fixed connection.

In particular for VANs, SUVs, pickups and light commercial vehicles, rubber, PUR-RIM, PVC and increasingly TPO are also used in the conventional art as a wear surface. For example, DE 10 2008 046 915 A1 discloses a multilayer, in particular deep-drawn moulded part, in particular a floor covering for lining a vehicle floor, having a TPO film as a cover layer which is fixedly arranged on a carrier layer, the TPO film having a fiber mat, in particular a polymer fiber mat, as a carrier layer.

The aforementioned floor trim, luggage compartment trim and load floor useful areas described in the conventional art do not have any special utility value properties beyond those specified by OEMs today, particularly with regard to wear and cleaning behaviour.

In WO 2018/219844 A1, a floor trim with a flocked useful surface is described, whereby this in particular exhibits improved wear behaviour. WO 2018/170115 A1 discloses a decorative nonwoven laminate. DE 10 2017 103 943 A1 discloses a trim part for a motor vehicle with printed thermoplastic films, the carrier layers of which are nonwoven fiber layers and/or heavy layers.

Furthermore, textile sheet structures are known as a useful area in the furniture industry, in which ceramic particles and/or glass particles and/or metallic particles are used as fillers of platelet-shaped coating elements. For example, DE 10 2014 110 611 A1 discloses a textile sheet material having a flexible substrate to which a plurality of platelet-shaped elements made of a more abrasion-resistant and stiffer material than the substrate is applied.

From DE 20 2016 006 953 U1, a flexible sheet structure, in particular made of textiles, artificial leather or net fabrics with a coating applied in defined areas, which has a high stretching or compressing capacity, is known.

However, this conventional art relates to two-dimensional deformations with low pull-out behaviour. The requirements found in the automotive sector for floor trims, luggage compartment trims and loading floors are not the focus here. Basically, it should be mentioned that the properties specified in the automotive industry, among others, with regard to acoustics, impact resistance, mechanical wear, bending stiffness, cleanability, media resistance, deformation behaviour, climate and heat aging resistance are not taken into account in the described conventional art.

Compared to this conventional art, embodiments of the present invention are therefore based on the task of providing a deformation-compatible and deformation-stable upper material (wear layer plus lower layers) for a trim part of a motor vehicle with improved utility value properties, which in particular comprises a wear- and cleaning-optimized useful area and meets the specified requirements of the automotive industry.

SUMMARY

An aspect relates to a motor vehicle interior trim part comprising a wear layer and, if appropriate, adhesive layers, acoustic/stiffening nonwovens, sealing and heavy foils and/or contact/foil nonwovens located underneath, the wear layer comprising, on the use side, a carrier material which is characterized in that the carrier material is completely or partially coated with coating particles. Corresponding thereto is a motor vehicle interior trim part comprising a floor trim, a luggage compartment trim or a loading floor with a wear layer on the use side with a carrier material consisting of a textile sheet structure with a visible side and adhesive layers, acoustic/stiffening nonwovens, sealing and heavy foils and/or contact/foil nonwovens located thereunder on its rear side, which is characterized in that the carrier material is coated completely or partially with coating particles (a) comprising a ceramic, glass and/or metal filler, including mixtures thereof, and further comprising an adhesive which holds the coating particles together and gives dimensional stability to them; or (b) comprise a latex material.

The coating particles have in particular a high abrasion resistance and stiffness. The abrasion resistance and stiffness are in particular greater than that of the carrier material. By coating with such coating particles, the motor vehicle interior trim part according to embodiments of the invention has a wear-optimized, washable and easy-to-clean useful area which meets the requirements in the motor vehicle sector. The specific layer structure also results in a lighter overall structure compared to the conventional art, with increased resistance to abrasion and soiling.

BRIEF DESCRIPTION

Some of the embodiments will be described in detail, with references to the following Figures, wherein like designations denote like members, wherein:

FIG. 1 shows a photograph of a motor vehicle interior trim component according to embodiments of the invention.

DETAILED DESCRIPTION

In an embodiment, the motor vehicle interior trim part is a floor trim, a luggage compartment trim or a load floor.

The motor vehicle interior trim part is in particular an upper material comprising a wear layer and underlying sublayers. All layers known in the conventional art and described above, such as adhesive layers, acoustic/stiffening nonwovens, sealing and heavy foils and/or contact/foil nonwovens, can be used as sublayers.

According to embodiments of the invention, the wear layer comprises a carrier material. In an embodiment, the carrier material comprises a textile sheet material, such as in particular a nonwoven fabric, a woven fabric, a knitted fabric, a nonwoven film, or a film. The material of the carrier material comprises polyamide (PA), polyethylene (PE), polypropylene (PP), polyester, in particular polyethylene terephthalate (PET), or copolymers or mixtures thereof. In particular, the carrier material may comprise one of the materials or a mixture thereof. In an embodiment, carrier materials comprise a PA or PET nonwoven, a PE/PA film, a PET/PP, PET/PA or PET/coPET nonwoven and/or a film nonwoven (PE/PA/PE-PET). The carrier material may also comprise one of these materials or a mixture thereof.

According to embodiments of the invention, the carrier material is fully or partially coated with coating particles. In particular, the carrier material may be fully coated with coating particles. However, the carrier material may also be partially coated with coating particles, in which case a portion of the carrier material remains exposed and visible in use even after coating. In an embodiment, 25 to 85% of the surface is coated. Alternatively, the degree of coating is 45 to 80%.

When the carrier material is only partially coated with the coating particles, the density of the coating may differ in different areas of the carrier material. In an embodiment, however, the carrier material is uniformly coated with the coating particles.

The arrangement of the coating particles may be non-uniform or uniform. In particular, the coating particles may be arranged in a uniform pattern.

The coating particles used may have a uniform or variable geometry. In the context of embodiments of the present invention, the geometry of the coating particles is understood to mean in particular their height, spacing and shape. If the coating particles have a uniform geometry, in particular a uniform height, a uniform spacing and/or a uniform shape, the motor vehicle interior trim part according to embodiments of the invention has in particular a uniform visual appearance.

The coating particles have a height in a range from 0.10 mm to 2.00 mm, or from 0.15 mm to 1.0 mm. The distance between the coating particles is from 0.10 mm to 5.00 mm, or from 0.5 mm to 2.50 mm.

The coating particles may have different shapes. Suitable shapes include, for example, round platelets, oval platelets, spheres, knobs, polygons, rhombuses, or any other basic geometric shape known from the conventional art or mathematics. By varying the geometry of the coating particles, in particular their height, spacing and shape, the wear behaviour can be adapted and optimised according to the specific application of the motor vehicle interior trim part according to embodiments of the invention.

In an embodiment, the geometry of the coating particles is designed to accommodate deformation. In particular, the height, the spacing and the shape of the coating particles are designed to conform to the deformation. A deformation-appropriate design is understood to mean, in particular, an adaptation to the shape of the motor vehicle interior trim part predetermined by the body of the vehicle.

The particular advantage of embodiments of the present invention then consists in the provision of deformation-optimized/stable as well as wear- and cleaning-optimized useful areas in the motor vehicle.

In an embodiment, the coating particles comprise an adhesive and a filler. The adhesive holds the coating particles together and provides dimensional stability. The filler reinforces the strength, especially the abrasion resistance, of the coating particles. Due to the filler, the coating particles used according to embodiments of the invention mainly have a higher abrasion resistance than the carrier material and thus provide the motor vehicle interior trim part according to embodiments of the invention with the extraordinarily increased wear optimization, as well as washable and easy-to-clean useful areas. The coating particles may in particular comprise adhesive and filler.

Further, the coating particles may optionally comprise a latex material or more particularly comprise a latex material, an adhesive and filler.

The adhesive is a dispersion adhesive, in particular a water-based dispersion adhesive. In particular, PUR-based adhesives can be used as dispersion adhesives. The dispersion adhesive is used to bind the loose filler and hold it in shape. The filler reinforces the strength of the particles. In an embodiment, the coating particles are thus highly filled dispersion adhesive particles. Highly filled dispersion adhesive particles comprise latex material, dispersion adhesive, fillers or consist largely or entirely of the materials. The highly filled dispersion adhesive particles may further comprise electrically conductive particles, or the highly filled dispersion adhesive particles may be electrically conductive particles.

The coating particles, in particular the highly filled dispersion adhesive particles, have a filler content in a range from 5 to 60% by volume, in particular from 10 to 50% by volume.

In an embodiment, the filler of the coating particles comprises ceramic, glass and/or metal. The filler may also comprise any of these materials or a mixture thereof. In particular, the filler may comprise or consist of mineral grains, mineral millings, primary rock flour, carbon fiber millings, and/or mixtures thereof. In an embodiment, the filler has a particle size in a range of 2 µm to 800 µm, more particularly 3 µm to 100 µm.

In particular, when the filler comprises or consists of metal, the filler and/or coating particles may be electrically conductive.

In an embodiment, the coating of the carrier material has different colors. A differently colored design can be achieved in particular by using coating particles which have different colors due to their composition or the type of filler used. Alternatively, dyes can also be used. By a different colored design, the motor vehicle interior trim part according to embodiments of the invention can be designed in a particularly visually appealing manner. Furthermore, patterns can also be realized.

The coating of the carrier material with the coating particles can be realized in particular by 3D coating known per se.

In an embodiment, carbon fibers are present in the carrier layer and/or between the wear layer and an acoustic/stiffening nonwoven. The carbon fibers make it possible to implement heating of the motor vehicle interior trim component according to embodiments of the invention. Furthermore, the dimensional stability of the component at usual temperatures within a motor vehicle is increased.

In an embodiment, a polymeric sliding layer is arranged between the carrier layer and the layers below it, which is in the form of a melt in the range of the usual processing temperatures. Typical processing temperatures are in the range of 90 to 240° C., particularly when a contact heating field and/or a radiant heating field is used. In an embodiment, the polymeric sliding layer comprises or consists of a PE. The PE has a weight per unit area in a range from 150 to 500 g/m².

The use of a polymeric sliding layer has the advantage that the carrier layer can slide (uniformly) on the layer(s) underneath during the three-dimensional deformation and that no damage can occur to the carrier layer due to adhesion, sticking and the like. Furthermore, the use of a sliding layer can also reduce warping of the useful area coating/coating pattern/coating geometry during deformation of the layer composite.

In an embodiment, the part of the carrier material still visible after coating is impregnated in whole or in part. Suitable impregnating agents comprise in particular special functionalized polymers/waxes, in particular aqueous dispersions thereof. By impregnating the still visible part of the carrier material, the cleaning behaviour of the motor vehicle interior trim part according to embodiments of the invention can be optimized.

In an alternative embodiment, the problem according to the invention is solved by using coating particles comprising an adhesive and a filler, wherein the filler comprises in particular ceramic, glass and/or metal, for coating an upper material of a motor vehicle interior trim part, such as a floor trim, a luggage compartment trim or a load floor. In general, the above-described coating particles which may find use in the motor vehicle interior trim part according to embodiments of the invention may be used. In an embodiment, highly filled dispersion adhesive particles are used.

EXAMPLE OF EMBODIMENT

The following multi-layer system was laminated and formed to produce a deformation-optimised/stable as well as wear- and cleaning-optimised useful area of a floor covering: A commercial ceramic dispersion adhesive particle-coated PET fabric/250 g/m² PE coating/640 g/m² mixed fiber stiffening fleece with 40% BiCo fiber content/144 g/m² film fleece.

FIG. 1 shows a section of the manufactured floor covering.

The Taber abrasion test (H18, 1000 g) of the surface after deformation withstood 3800 revolutions.

It should be emphasized that due to the deformation no splitting of the backing layer as well as deformation "lines" are visible. The produced automotive interior trim part has some intrinsic performance properties such as abrasion, stain and cut resistance as well as breathability, fast drying and durability.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A motor vehicle interior trim part selected from the group consisting of a floor trim, a luggage compartment trim, and a load floor with the interior trim part comprising a wear layer on a use side of the interior trim part with a carrier material consisting of a textile sheet structure with a visible side and underneath on a rear side of the textile sheet structure is a layer or layers selected from the group consisting of adhesive layers, acoustic/stiffening nonwoven layers, sealing and heavy foil layers, and contact/foil nonwovens, characterized in that the carrier material is coated completely or partially with coating particles, comprising
   (a) a ceramic, glass and/or metal filler, including mixtures thereof and further comprising an adhesive which holds the coating particles together and gives dimensional stability to them, or
   (b) a latex material,
   wherein the filler has a particle size in a range of 2 μm to 800 μm, and the coating particles used have a variable geometry in a context of height, spacing and shape,
   wherein a polymeric sliding layer, which is in a molten state in the range of the processing temperatures, is arranged between the carrier layer and layers located thereunder.

2. The motor vehicle interior trim part according to claim 1, wherein the textile sheet structure is selected from the group consisting of a nonwoven fabric, a woven fabric, a knitted fabric, a film nonwoven, or a film, wherein the nonwoven fabric, the woven fabric, the knitted fabric, the foil nonwoven or the foil comprises a polymer selected from the group consisting of polyamide, polyethylene, polypropylene, polyester, polyethylene terephthalate, or copolymers or mixtures thereof.

3. The motor vehicle interior trim part according to claim 1, wherein a geometry of the coating particles is configured to conform to deformation.

4. The motor vehicle interior trim panel according to claim 1, wherein the adhesive which holds the coating particles together comprises a dispersion adhesive.

5. The motor vehicle interior trim part according to claim 1, wherein the coating of the carrier material has a different color.

6. The motor vehicle interior trim part claim 1, wherein carbon fibers are located in the carrier layer and/or between the wear layer and an acoustic/stiffening nonwoven.

7. The motor vehicle interior trim part according to claim 1, wherein the polymeric sliding layer comprises or consists of a PE comprising a weight per unit area in a range from 150 to 500 g/m².

8. The motor vehicle interior trim part according to claim 1, wherein a part of the carrier material which is still visible after the coating has an impregnation.

* * * * *